(No Model.)
M. F. McCRAY & J. E. NORTON.
COMBINATION TOOL.
No. 382,181. Patented May 1, 1888.
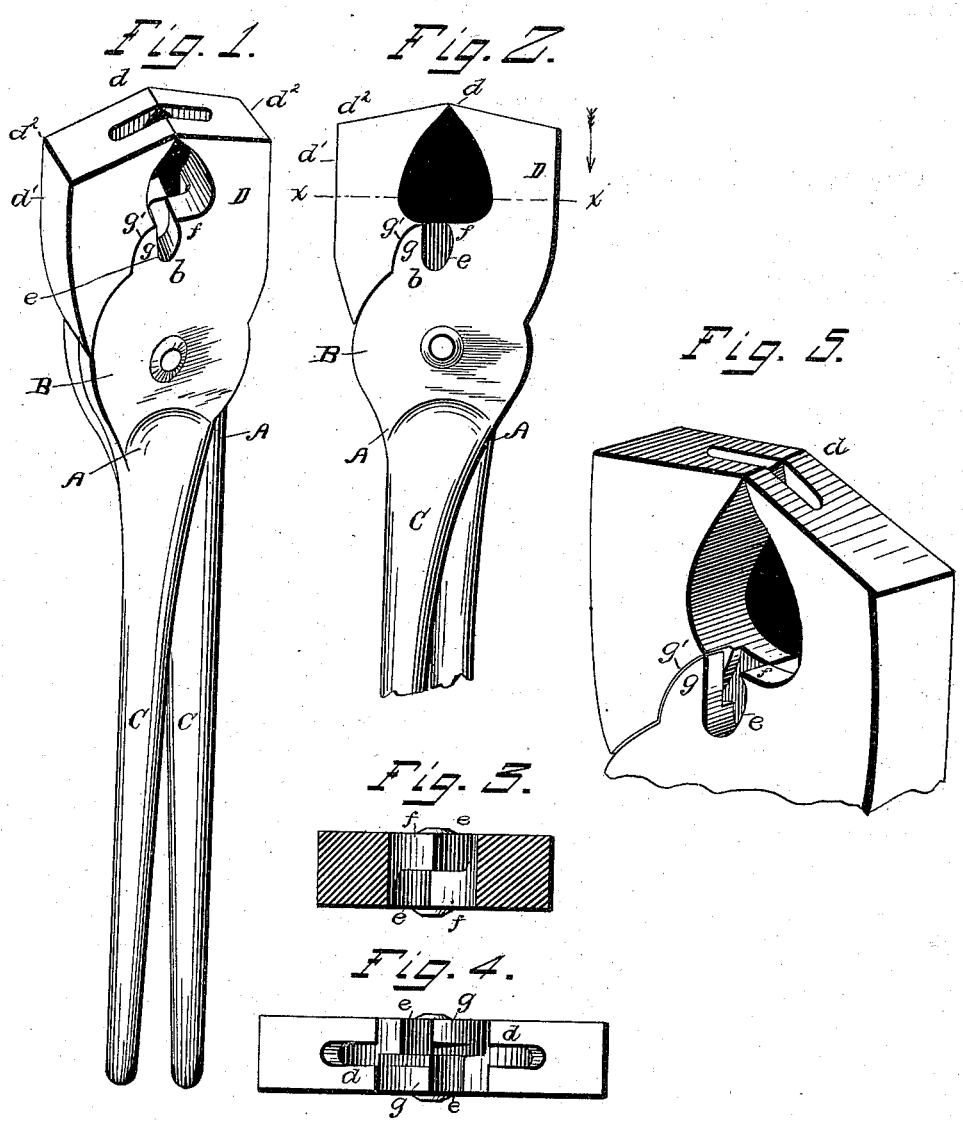

UNITED STATES PATENT OFFICE.

MILLARD F. McCRAY, OF COWGILL, MISSOURI, AND JOHN E. NORTON, OF DETROIT, MICHIGAN.

COMBINATION-TOOL.

SPECIFICATION forming part of Letters Patent No. 382,181, dated May 1, 1888.

Application filed July 12, 1887. Serial No. 244,102. (No model.)

*To all whom it may concern:*

Be it known that we, MILLARD F. McCRAY, residing at Cowgill, county of Caldwell, State of Missouri, and JOHN E. NORTON, residing at Detroit, in the county of Wayne and State of Michigan, citizens of the United States, have invented certain new and useful Improvements in Combination-Tools; and we do declare the following to be a full, clear, and exact description of the invention, such as will enable others skilled in the art to which it appertains to make and use the same, reference being had to the accompanying drawings, and to the letters or figures of reference marked thereon, which form a part of this specification.

This invention relates to improvements in combined hammer, staple-extractor, nippers, and cutting-pliers.

The object of the invention is the production of a combination-tool for the purpose above mentioned, which will be simple, compact, and economical in construction, efficient and durable in operation, and not liable to get out of repair. The several tools necessary for the construction and taking down of wire fences are combined in a single implement in this, and do not occupy any more room than any of the ordinary tools. Furthermore, each part of the tool performs its work just as well and with as much satisfaction as any tool specially constructed for this work solely. As a staple-extractor it performs its work without bending the staples.

The improvement consists in the novel features more fully hereinafter set forth and claimed, and shown in the accompanying drawings, in which—

Figure 1 is a perspective view of a combination-tool embodying our invention; Fig. 2, a side view of the tool having the lower ends of the levers broken off; Fig. 3, a section on the line X X of Fig. 2, looking in the direction of the arrow; Fig. 4, a top view showing the jaws open, and Fig. 5 a detail perspective view showing the clearance-space between the wire-guide projection of one lever and the side of the other lever.

The implement is composed of two levers, A, counterparts of each other, pivoted together near one end, after the fashion of a pair of tongs or pliers. Each lever is divided into three parts—the hub B, the head D, and the lever portion or handle C. The head D has a claw, $d$, at its inner corner, which may be used as a nail-extractor, or, in conjunction with the claw of the opposite lever, as a staple-extractor, nippers, or pliers, and its outer side is straight, forming the hammer-face $d'$, which intersects with the sloping end of the head, forming the fulcrum $d^2$, at a distance from the end of the claw, which fulcrum is invariable and fixed, so that the force exerted to extract the staple is applied in a direct line, or nearly parallel with the staple, thereby performing the work without bending the staple.

When the implement is closed, the hammer-faces are parallel to each other and to a line passing parallel between the ends of the claws and through the pivotal point of the levers. The hub is widened at $b$, diametrically opposite the handle, or between the pivotal point of the levers and the end of the claw, to provide for the formation of the wire-cutter and the wire-guide projection, and the widened portion $b$ is provided with the notch $e$, forming the cutter $f$ and the guide projection $g$, which slopes on its front side from top to bottom. The cutter $f$ extends flush with the inner side of the hub, so that when the device is closed the cutters of the two levers will be contiguous. The wire-guide projection $g$ does not come flush with the inner side of the hub, so that a space is left between its side and the cutter of the opposite lever to give clearance for splinters and permit a slight bending of the wire previous to the cutting of the same, which thereby facilitates the operation. In this connection it must be remembered that two opposing cutters, acting upon a piece of material placed between them, has a tendency, when the said cutters are closed upon the said material, to bend it out of line, particularly so if the material is not supported close up to and on each side of the cutters. Now, as there is a space on each side of the plane of the cutters between them and the wire-guide projections, it will be readily understood how, when the cutters are closed upon a wire, the wire will be slightly bent prior to its being cut. The lower end of the head of one lever overlaps the hub of the other lever, and is provided with a recess forming the shoulder $g'$, against which the wire-guide projection $g$ impinges, and limits the closing of the levers and prevents the crowding of the ends of the claws.

In practice the tool is used as a pair of pinchers or tongs, by gripping the article to be handled between the claws; as a staple-extractor, by clamping the legs of the staple between the ends of the claws, and having the staple fitted in the spaces between the claws; as a hammer, by closing the levers and grasping the two handles in the hand; finally, as a wire-cutter, by partially opening the levers until the notches in the hubs correspond, and placing the wire in said notches, and then bringing the ends of the handles together with sufficient force to sever the wire.

This combination-tool has its cutting-slot outside of the radial circle or radius of the hub upon which the jaws revolve, rendering quicker action and greater capacity, because of their distance from the center, and thereby being an improvement over prior devices of a like nature.

This tool combines and includes a complete wire-nipper, a powerful wire cutter and extractor, a convenient hammer for driving nails and other substances, and is made of durable gray iron, chilled or cast steel, or other suitable metal.

Having thus described our invention, what we claim, and desire to secure by Letters Patent, is—

1. The herein shown and described combination-tool, for the purposes specified, composed of two levers, each lever having a head, hub, and handle pivoted together, the head having a claw at its inner corner and a hammer-face at its outer side, which intersects with the sloping end of the head, forming a fixed fulcrum, the hub having a widened portion intermediate the claw, and the pivotal point of the levers provided with a notch forming a cutter which extends flush with the inner side of the hub, and a wire-guide projection having its inner side extended to within a short distance of, but not flush with, the plane of the inner side of the hub, substantially as and for the purpose set forth.

2. The combination of the two levers, each lever composed of a head, hub, and handle pivoted together, each lever having the cutter extended from the hub flush with its inner side, and the wire-guide projection located at a distance from the cutter and having its inner side arranged at a short distance from the plane of the inner side of the hub, substantially as and for the purpose specified.

3. The herein shown and described combination-tool, composed of two levers, each lever having a head, hub, and handle pivoted together, the head having a claw at its inner corner, and a hammer-face at its outer side, which intersects with its sloping end, forming a fixed fulcrum, and having its lower end overlapping the hub, which is widened between the end of the claw and the pivotal point, and has a notch in said widened portion forming a cutter flush with the inner side of the hub, and a wire-guide projection sloping on its outer edge and fitting a corresponding recess in the lower end of the head, and having its inner side extended close to, but not flush with, the inner side of said hub, substantially as and for the purpose described.

In testimony whereof we affix our signatures in presence of two witnesses.

MILLARD F. McCRAY.
JOHN E. NORTON.

Witnesses to McCray's signature:
J. H. CONLEY,
GEO. W. WAGENSLER.

Witnesses to Norton's signature:
J. W. DONOVAN,
LIZZIE M. S. BROMLEY.